(12) United States Patent
Sakamoto (10) Patent No.: US 6,731,033 B2
(45) Date of Patent: May 4, 2004

(54) MOTOR-DRIVEN SYSTEM WITH STATOR PROVIDED WITH INDUCTORS

(75) Inventor: Masafumi Sakamoto, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 77 days.

(21) Appl. No.: 09/915,335

(22) Filed: Jul. 27, 2001

(65) Prior Publication Data

US 2002/0024267 A1 Feb. 28, 2002

(30) Foreign Application Priority Data

Jul. 28, 2000 (JP) .......................... 2000-229794
Jul. 3, 2001 (JP) .......................... 2001-202713

(51) Int. Cl.⁷ .......................... H02K 7/10; H02K 37/00; H02K 21/26; H02K 21/12; H02K 7/12
(52) U.S. Cl. .................. 310/75 R; 310/75 D; 310/83; 310/49 R; 310/261; 310/254; 310/154.08; 310/156.09; 310/154.11; 310/156.11
(58) Field of Search .............. 310/75 R, 75 D, 310/49 R, 261, 254, 83, 756, 156, 154.08, 154.11, 154.16, 154.25, 154.28, 156.09, 156.11, 156.15, 156.52

(56) References Cited

U.S. PATENT DOCUMENTS

| | | | | |
|---|---|---|---|---|
| 4,274,023 A | * | 6/1981 | Lamprey | 310/83 |
| 4,359,657 A | * | 11/1982 | Matsumoto et al. | 310/156.26 |
| 4,628,891 A | * | 12/1986 | Asai et al. | 123/599 |
| 4,763,034 A | * | 8/1988 | Gamble | 310/49 R |
| 5,006,943 A | * | 4/1991 | Elsasser et al. | 360/99.08 |
| 5,289,064 A | * | 2/1994 | Sakamoto | 310/49 R |
| 5,334,894 A | * | 8/1994 | Nakagawa | 310/49 R |
| 5,412,268 A | * | 5/1995 | Arnaud et al. | 310/67 R |
| 5,744,895 A | * | 4/1998 | Seguchi et al. | 310/266 |
| 6,051,898 A | * | 4/2000 | Sakamoto | 310/49 R |
| 6,081,058 A | * | 6/2000 | Suzuki et al. | 310/156.45 |

OTHER PUBLICATIONS

Patent Abstracts of Japan, JP 62–290341, Dec. 17, 1987.

* cited by examiner

Primary Examiner—Burton S. Mullins
Assistant Examiner—Julio C. Gonzalez
(74) Attorney, Agent, or Firm—Oblon, Spivak, McClelland, Maier & Neustadt, P.C.

(57) ABSTRACT

There is provided a motor-driven system which realizes an optimum driving mode for an electric automobile, a robot carrier car, a drum of a copying machine, etc., and a motor-driven system having a function as an optimum actuator for such driving. In a rotational electric machine provided with a stator and an outer rotor type permanent magnet rotor, the stator having an annular magnetic substance, main poles provided so as to extend radially outward from the annular magnetic substance, windings wound on the main poles respectively, and inductors each constituted by a plurality of magnetic teeth formed at a forward end of corresponding one of the main poles, the rotor having north (N) and south (S) magnetic poles arranged alternately on an inner circumference of the rotor and in a rotating direction of the rotor, the stator and the rotor being in opposition to each other while an air gap is held therebetween, there is provided a motor-driven system in which an outer rotating body such as a tire, a drum, a table or the like is mounted on an outer circumferential portion or on a side portion of the rotor.

34 Claims, 8 Drawing Sheets

MOTOR-DRIVEN SYSTEM WITH STATOR PROVIDED WITH INDUCTORS

BACKGROUND OF THE INVENTION

1. Field of the Invention

The present invention generally relates to a motor-driven system. It particularly relates to a motor-driven system for use in a motor-driven golf cart, a motor scooter, an electric automobile, and a robot carrier car; a motor-driven system for use in index table driving, dram driving in a copying machine or the like; and a motor-driven system for use in a game machine and so on.

2. Description of the Related Art

Conventionally, as the electric motor of an electric automobile, a permanent magnet type brushless motor, or a reluctance type brushless motor which does not use any permanent magnet has been used.

Further, as the motor for driving a transfer drum of a copying machine or for driving a drum of a laser beam printer, an inner rotation type electric motor provided with a reduction gear has been used.

In the configuration of such a conventional motor-driven system as described above, however, there were problems as follows.

(1) Since the electric motor had no inductors formed out of magnetic teeth provided at the forward ends of the respective main poles of the stator, the number of the poles of the rotor was small so that the torque at a low speed was small.

(2) In the case of performing direct driving without use of any reduction gear, it was necessary to make the number of the poles of the rotor large, and, at that time, the number of the main poles of the stator (equal to the number of slots) was large, the inner diameter of the stator was large and the motor per se was large in size.

(3) Even in the case of using a reduction gear, if the number of the poles of the rotor was small, the reduction gear ratio was large.

(4) In the case of closed loop driving, there was a problem that the system was expensive and the torque at a low speed was small, because the stator had no inductors and the driving was not of a 3-phase system which was simple in driving and which was large in torque.

BRIEF SUMMARY OF THE INVENTION

It is an object of the present invention to solve the above problems and to provide a motor-driven system having a stator provided with inductors constituted by magnetic teeth at the forward ends of the respective main poles of the stator to thereby realize an optimal driven system for an electric automobile, a robot carrier car, a dram of a copying machine or the like.

In order to achieve the above object, according to a first aspect of the present invention, a rotational electric machine comprises: a stator having an annular magnetic substance, main poles provided so as to extend radially outward from the magnetic substance, windings wound on the main poles respectively, and inductors each constituted by a plurality of magnetic teeth formed at a forward end of corresponding one of the main poles; and an outer rotor type permanent magnet rotor having north (N) and south (S) magnetic poles arranged alternately on an inner circumference of the rotor and in a rotating direction of the rotor, the stator and the rotor being in opposition to each other while an air gap is held therebetween. In the rotational electric machine, a motor-driven system is provided so that an outer rotating body such as a tire, a drum, a table or the like is mounted on an outer circumferential portion or on a side portion of the rotor.

According to a second aspect of the present invention, a rotational electric machine comprises: a stator having an annular magnetic substance, main poles provided so as to extend radially outward from the magnetic substance, windings wound on the main poles respectively, and inductors each constituted by a plurality of magnetic teeth formed at a forward end of corresponding one of the main poles; and an outer rotor type rotor constituted by a magnetic substance having magnetic teeth formed on an inner circumference thereof, the stator and the rotor being in opposition to each other while an air gap is held therebetween. In the rotational electric machine, a motor-driven system is provided so that an outer rotating body such as a tire, a drum, a table or the like is mounted on an outer circumferential portion or on a side portion of the rotor.

According to a third aspect of the present invention, in a rotational electric machine according to the first and second aspects, a motor-driven system wherein an outer rotating body such as a tire, a drum, a table or the like is mounted on the outer circumferential portion or on the side portion of the rotor through an output portion of a reduction gear, the output portion being concentric with a rotation shaft and output of the rotational electric machine.

According to a fourth aspect of the present invention, in a rotational electric machine according to any one of claims the first to third aspects, a motor-driven system is provided so that the stator has a 3-phase winding structure.

According to a fifth aspect of the present invention, as stated in claim 5, in a rotational electric machine according to any one of the first to third aspects, or in a rotational electric machine which is obtained by changing an outer roller type rotational electric machine according to the first or second aspects into an inner rotor type, or in a rotational electric machine of the inner rotor type and of a 3-phase HB type in which the number of rotor teeth is P, a motor-driven system is provided so that, as a voltage to be applied to the rotational electric machine, a voltage of a battery is used while the battery voltage is stepped up/down by chopping, wherein $P=m(3n\pm1)$ in which m is the number of main poles of the stator for each phase and an integer not smaller than 1, or $P=k(6n\pm1)$ in which 2 k is the number of main poles of the stator for each phase and each of k and n is an integer not smaller than 1.

According to a sixth aspect of the present invention, in a rotational electric machine according to any one of the first to third aspects, or in a rotational electric machine which is obtained by changing an outer rotor type rotational electric machine according to the first or second aspects into an inner rotor type, or in a rotational electric machine of the inner rotor type and a 3-phase HB type in which the number of rotor teeth is P, a motor-driven system is provided so that a phase of current relative to a motional electromotive force of the rotational electric machine is controlled, and so that $P=m(3n\pm1)$ in which m is the number of main poles of the stator for each phase and an integer not smaller than 1, or $P=k(6n\pm1)$ in which 2 k is the number of main poles of the stator for each phase and each of k and n is an integer not smaller than 1.

Further, according to a seventh aspect of the present invention, in a rotational electric machine according to any one of the first to third aspects, or in a rotational electric machine which is obtained by changing an outer rotor type rotational electric machine according to the first or second aspects into an inner rotor type, or in a 3-phase rotational electric machine of an outer or inner rotor type having main poles the number of which is 3 m or 6 k with 3-phase windings, the rotor being of a HB type in which the number of rotor teeth is P or being of a cylindrical type in which the number of rotor poles is 2P and the cylindrical rotor is magnetized into north (N) and south (S) magnetic poles alternately, a motor-driven system is provided so that positional information of the rotor is obtained to thereby obtain timing of excitation of windings, and so that P=m(3n±1) in which m is the number of main poles of the stator for each phase and an integer not smaller than 1, or P=k(6n±1) in which 2 k is the number of main poles of the stator for each phase and each of k and n is an integer not smaller than 1.

According to an eighth aspect of the present invention, in a rotational electric machine according to any one of the first or third aspects, or in a rotational electric machine which is obtained by changing an outer rotor type rotational electric machine according to the first or second aspects into an inner rotor type, or in a 3-phase rotational electric machine of an outer or inner rotor type having main poles the number of which is 3 m or 6 k with 3-phase windings, the rotor being of a HB type in which the number of rotor teeth is P or being of a cylindrical type in which the number of rotor poles is 2P and the cylindrical rotor is magnetized into north (N) and south (S) magnetic poles alternately, a motor-driven system is provided so that the axis of the rotating magnetic field is excited by the 3-phase excitation, microstep excitation or fullstep excitation which is advanced by $\gamma$ degrees with respect to the shaft of the rotor at a present position. Here, P=m(3n±1) in which m is the number of main poles of the stator for each phase and an integer not smaller than 1, or P=k(6n±1) in which 2 k is the number of main poles of the stator for each phase and each of k and n is an integer not smaller than 1.

According to a ninth aspect of the present invention, a motor-driven system according to the eighth aspect is provided so that the value of $\gamma$ is equal to 90° ($\gamma$=90°) in terms of electrical angle.

Further, according to a tenth aspect of the present invention, a motor-driven system according to the eighth aspect is provided so that when the value of $\gamma$ is in a range of 0<$\gamma$<=90°, the motor is driven as an open loop stepping motor, or when $\gamma$>90°, the motor is driven as a closed loop brushless motor.

DESCRIPTION OF THE PREFERRED EMBODIMENTS

Hereunder, with reference to FIGS. 1 through 5, FIGS. 6A and 6B, FIGS. 7A and 7B and FIGS. 8A and 8B, first to seventh embodiments of the motor-driven system having a stator provided with inductors (hereinafter simply referred to as "the motor-driven system") according to the present invention will be described.

First Embodiment

First, with reference to FIGS. 1 through 3, the first embodiment of the motor-driven system according to the present invention will be described.

Figure 1:
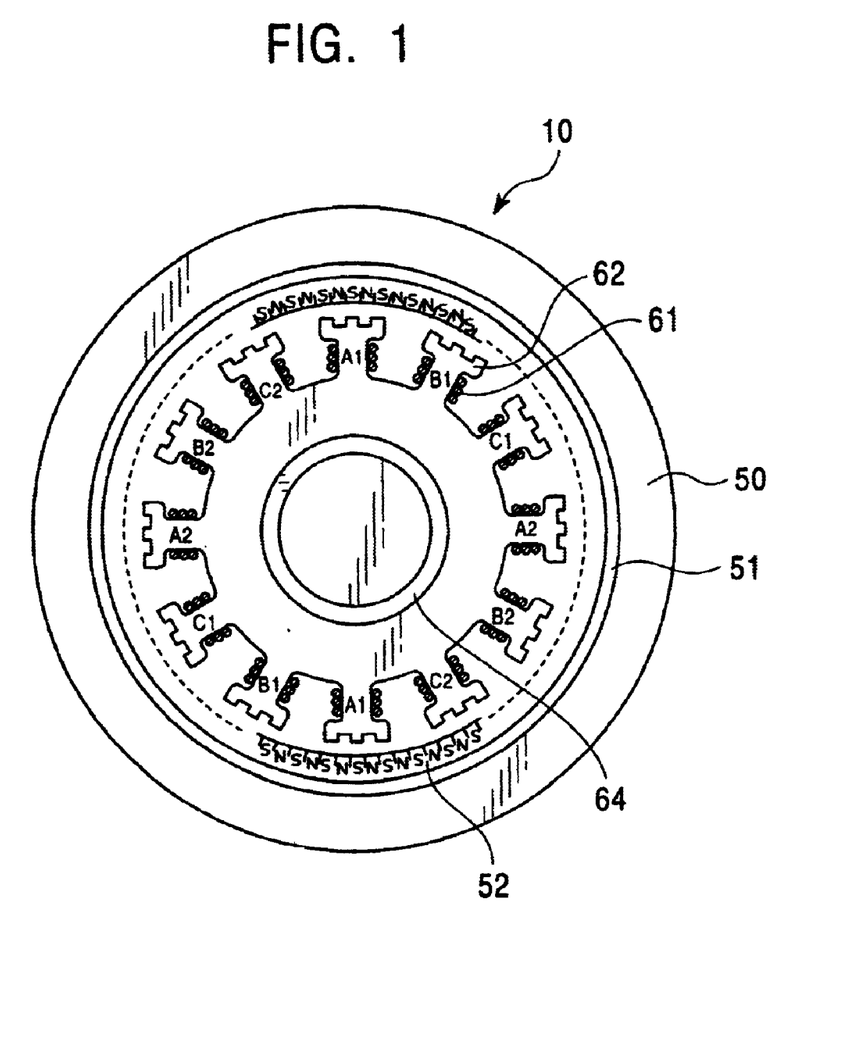
FIG. 1 is a front view showing a first embodiment of the motor-driven system according to the present invention.
Figure 2:
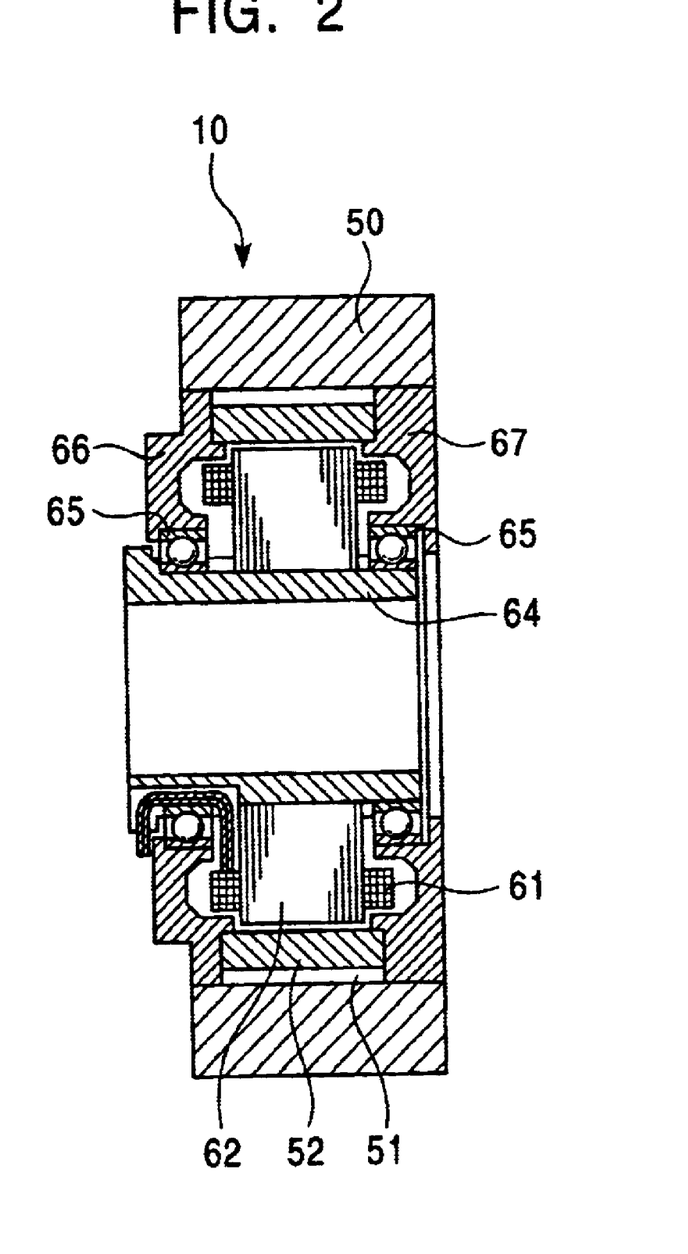
FIG. 2 is a vertically sectioned side view of FIG. 1.
Figure 3:
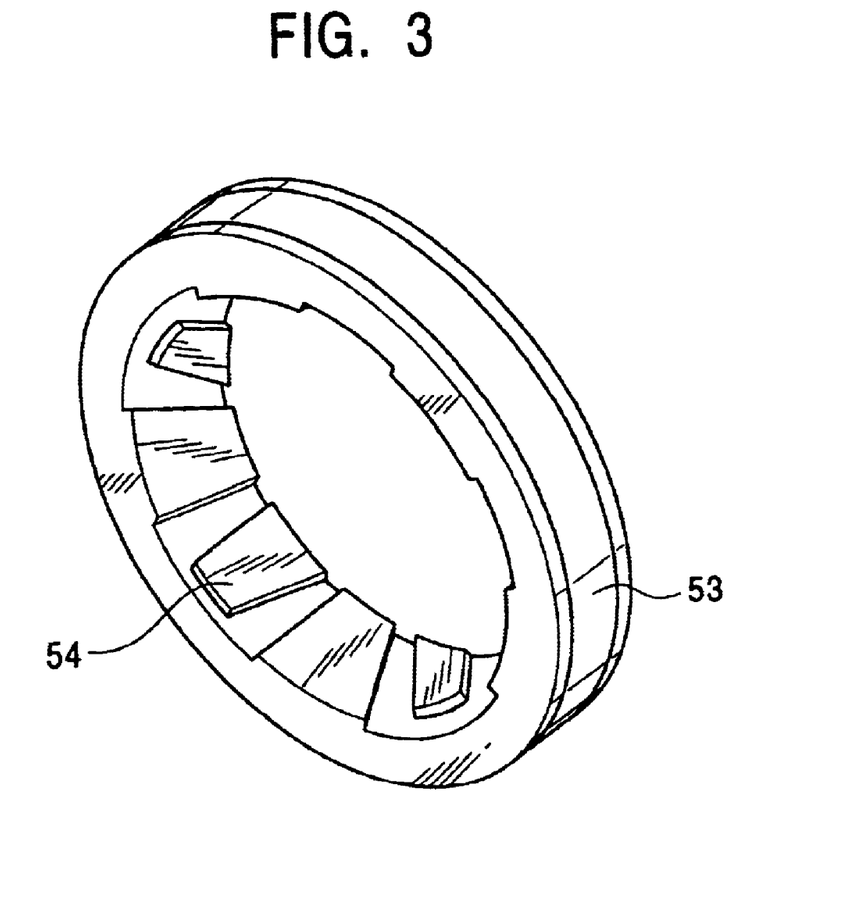
FIG. 3 is a perspective view showing the shape of another rotor which can be adapted to the first embodiment.

FIG. 1 is a front view of the first embodiment of the motor-driven system according to the present invention, FIG. 2 is a vertically sectioned side view of FIG. 1, and FIG. 3 is a perspective view showing the shape of another rotor which can be adapted to the first embodiment.

As shown in FIG. 1, the main configuration of a motor-driven system 10 of the first embodiment is constituted by an outer rotor type rotor 52 made of a permanent magnet having north (N) and south (S) magnetic poles formed alternately on the inner circumferential portion, a stator 62 made of a magnetic substance, and an outer rotating body 50 such as a tire, a drum or the like.

The stator 62 has a plurality of main poles (twelve in FIG. 1) A1–C2 formed radially, and windings 61 wound on the main poles A1–C2. The main poles of the stator 62 are disposed in opposition to the magnetic pole portion of the rotor 52 through an air gap. Incidentally, the numerical number 64 designates a hollow fixed shaft.

In this case, as the number of pole pairs (number of N-S pairs) of the rotor 52 becomes large, generally, the torque increases and the motor rotates smoothly at a low speed.

However, in order to increase the number of pole pairs of the rotor 52, it is necessary to increase the number of main poles of the stator 62 correspondingly. This results in increase in the number of coils, complex configuration of the motor and high cost. Accordingly, there is a limit in making such increase in the number of pole pairs as a matter of course.

In the motor-driven system 10 of this embodiment, each of the main poles A1–C2 of the stator 62 is provided with an inductor constituted by a plurality of magnetic teeth formed at the forward end of the main pole, as shown in FIG. 1. That is, the inductors formed at the forward ends of the respective main poles A1–C2 are made to be in opposition to the magnetic poles of the rotor 52.

Incidentally, in FIG. 1, the reference numeral 51 designates a magnetic back yoke for the outer rotor type rotor 52. It is desirable to provide such a magnetic back yoke 51 to make the magnetic path sure.

In FIG. 2, the reference numeral 64 designates a fixed shaft; 65, bearings; and 66 and 67, brackets provided on the opposite sides of the motor.

Although the rotor 52 has a configuration of a permanent magnet type rotor constituted by a ring-like integral magnet as shown in FIG. 1, the rotor 52 is not limited to such a configuration.

For example, as shown in FIG. 3, the rotor 52 may have a configuration of a special hybrid type rotor (hereinafter referred to as a "HB-type rotor") in which two rotor magnetic poles 54 formed from claw-pole-like magnetic substances respectively are used so that a permanent magnet 53 magnetized in two poles in the axial direction is sandwiched by the two rotor magnetic poles 54.

Second Embodiment

Next, with reference to FIGS. 4 and 5, a second embodiment of the motor-driven system according to the present invention will be described.

Figure 4:
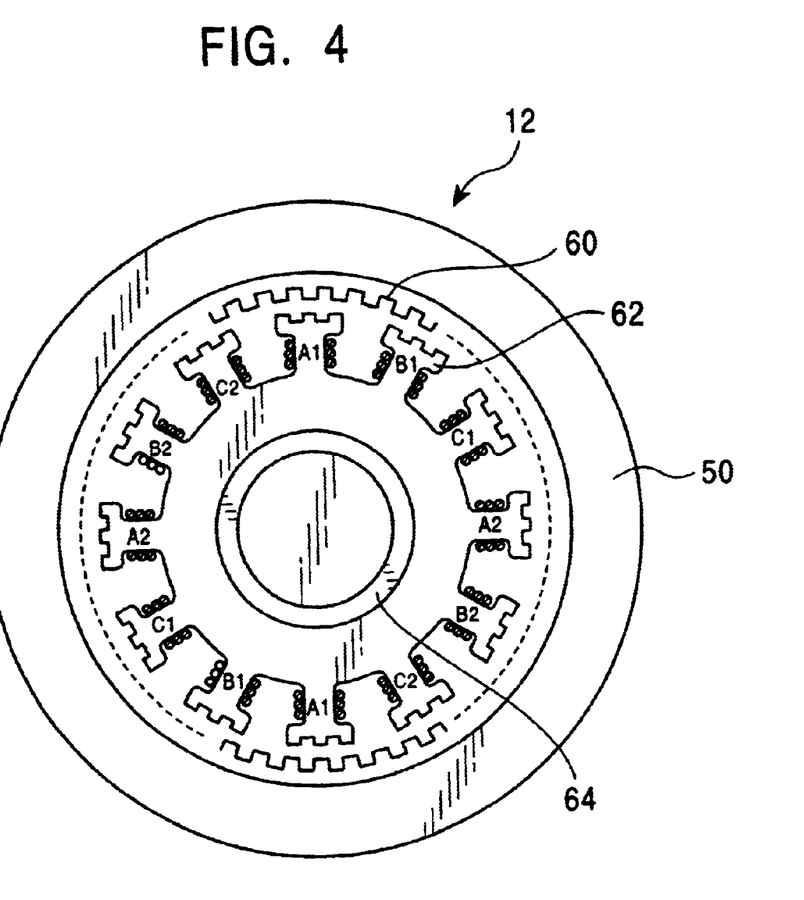
FIG. 4 is a front view showing a second embodiment of the motor-driven system according to the present invention.
Figure 5:
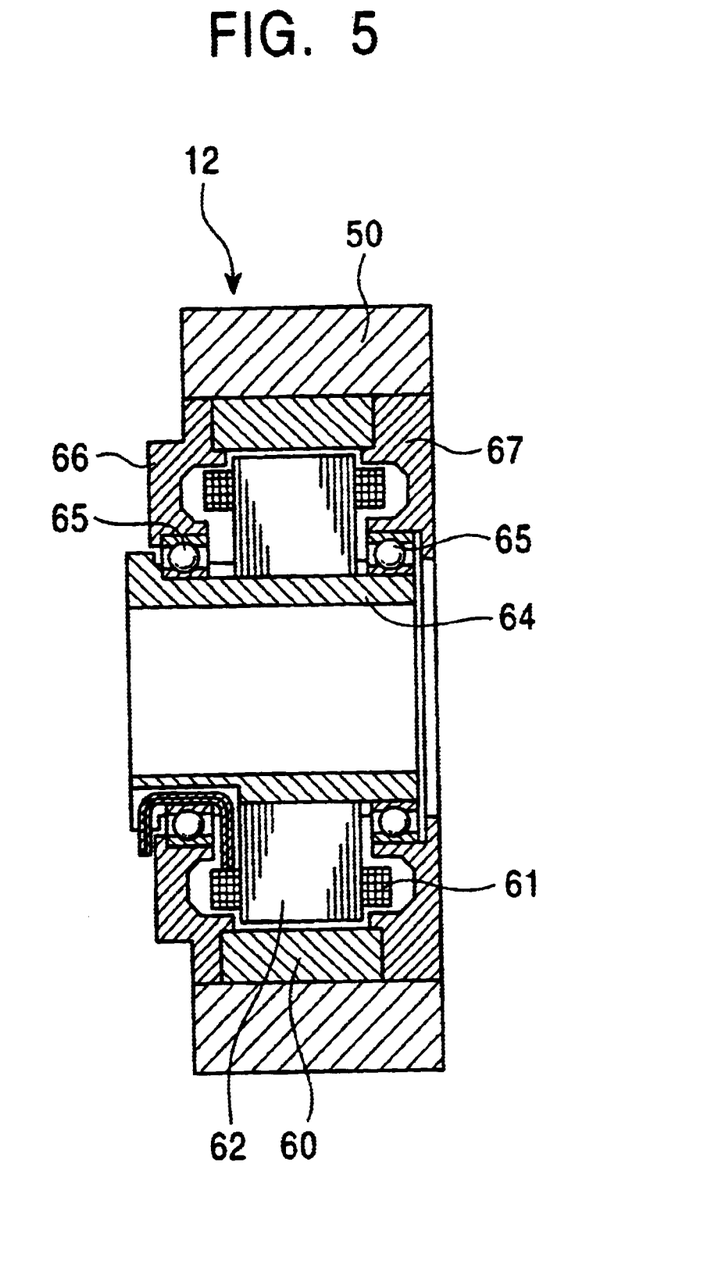
FIG. 5 is a vertically sectioned side view of FIG. 4.

FIG. 4 is a front view showing the second embodiment of the motor-driven system according to the present invention, and FIG. 5 is a vertically sectioned side view of FIG. 4.

Incidentally, in FIGS. 4 and 5, one and the same reference number is attached to a constituent part common to each other. Further, constituent parts in FIGS. 4 and 5 the same as or similar to those in FIGS. 1 to 3 are referenced correspondingly. Accordingly, repeated description can be avoided.

The motor-driven system 12 in this embodiment shows the case where the rotor 60 has teeth of a magnetic substance as shown in FIG. 4, and the rotor 60 is made to be in opposition to the stator 62 in the same manner as that shown in FIG. 1.

In this case, the rotor 60 is not magnetized into multiple poles so that the resolution can be made larger than that in FIG. 1. In this case, however, the field is not a permanent magnet field, there is a defect that the generated torque is apt to be non-linear relative to the exciting current. Thus, the rotor 60 has a difficulty in controllability.

However, on the other hand, low cost and so on is the merit of the rotor 60.

The rotational electric machine to be used in each of the motor-driven systems 10 and 12 shown in FIGS. 1 to 5 is of a 3-phase type.

The connection of the 3-phase type machine is realized by star-connection or delta-connection so that 3-terminal driving can be performed to make the driving simple in comparison with any other phase structure.

Further, in this 3-phase type rotational electric machine, it is possible to obtain smooth rotation which is not affected by a third harmonic contained in the magnetic field or current. Accordingly, it can be said that the 3-phase type rotational electric machine is an actuator adapted for an electric automobile, or the like.

Third Embodiment

Next, with reference to FIGS. 6A and 6B, a third embodiment of the motor-driven system according to the present invention will be described.

Figure 6A:
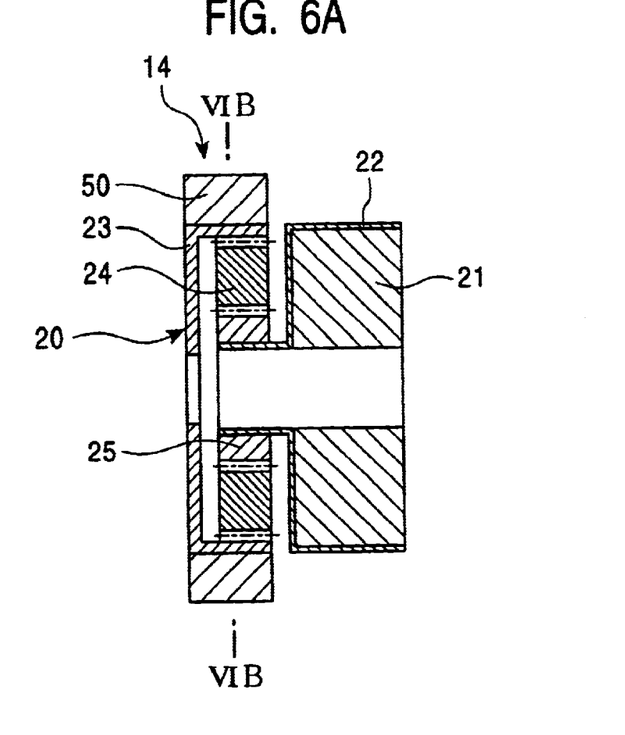
FIG. 6A is a vertically sectioned side view showing a third embodiment of the motor-driven system according to the present invention.
Figure 6B:
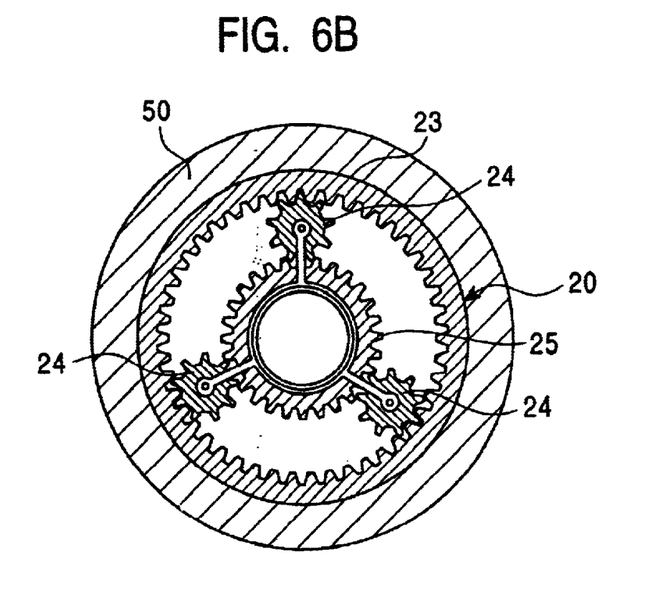
FIG. 6B is a radially sectioned view along a line of VIB—VIB in FIG. 6A.

FIGS. 6A and 6B show the configuration of a motor-driven system 14 of the third Embodiment. Specifically, FIG. 6A is a vertically sectioned side view of the third embodiment of the motor-driven system 14, and FIG. 6B is a radially sectioned view along a line of VIB—VIB in FIG. 6A.

Incidentally, FIGS. 6A and 6B, one and the same reference number is attached to a constituent part common to each other. Further, constituent parts used in FIGS. 6A and 6B and the same as or similar to those in FIGS. 1 through 5 are referenced correspondingly. Accordingly, repeated description can be avoided.

As shown in FIGS. 6A and 6B, the motor-driven system 14 in this embodiment corresponds to that which is stated in claim 3. A planet gear type reduction gear or a harmonic reduction gear 20, which is arranged concentrically with an input side rotary shaft 22 and performs reduction gear and output, is mounted on the outer circumference or side surface of the rotor of the rotational electric machine 21 as an outer rotor type electric motor. Internal constituent parts to be used in the motor-driven system 14 of this embodiment are omitted in illustration here.

Here, in the motor-driven system 14 shown in FIG. 6A, the reduction gear 20 is mounted on a side surface and the outer rotating body 50 is mounted on the output outer circumference or the like of the reduction gear 20.

In this case, though the structure of the motor-driven system 14 becomes complex in comparison with a single motor, large torque can be obtained in the motor-driven system 14 according to the present invention.

Incidentally, FIGS. 6A and 6B show the configuration of the planet reduction gear as the reduction gear 20. In this case, the planet reduction gear 20 is constituted by an internally toothed gear 23, planet gears 24 and a sun gear 25 which is connected to the rotary shaft 22.

By providing the planet reduction gear or the harmonic reduction gear 20 which is arranged coaxially with the rotational electric machine 21, it is possible to form a motor-driven system compact in size and large in torque. In this case, the load inertia in the terms of the motor shaft becomes small.

Incidentally, in this case, the reduction gear ratio may be about 1/25 relative to that of a conventional motor.

This is because the number of poles in the conventional motor which has been used in these applications is 4 (four) on the average, while the number of poles in the motor used in the motor-driven system according to the present invention is 100 on the average.

Further, since the reduction gear 20 is of a concentric type, the reduction gear 20 can be made compact in comparison with that of a general eccentric type.

Assume that the number of pairs of the magnetic poles of the rotor of the motor is represented by P, the density of magnetic flux in the gap is represented by B, the number of turns in the coil of windings is represented by n, the current is represented by I, the generated torque is represented by T, the electric angular velocity of the rotor is represented by ω, and the mechanical angular velocity of the rotor is represented by $\omega_m$, then the two expressions are established as follows.

$$T=(P)(B)(n)(I) \tag{1}$$

$$\omega_m=\omega/P \tag{2}$$

From these expressions, it can be understood that the torque T becomes large in proportion to the number of pole pairs P and that the mechanical angular velocity $\omega_m$ of the rotor becomes smaller as the number of pole pairs P becomes larger.

That is, the motor to be used in this embodiment is a low-speed and large-torque motor.

This feature is a characteristic adapted for an electric automobile or the like.

This is because the electric automobile requires large torque at start-up but it requires smaller torque as the speed becomes high.

However, there may be a case where a motor requires large torque even at a high speed. Two driving techniques of the motor-driven system according to the present invention suited to such a case will be described as follows.

Incidentally, each of the motors is of an outer rotor type which is suited to an outer rotor wheel-in-motor. However, the following two driving techniques are, of course, applicable to a motor of an inner rotor type so long as the motor has multi-poles and is provided with inductors.

Of the various configurations of motors, there is a 3-phase HB type rotational electric machine in which a HB type rotor is used. In the HB type rotor, two gear-like bodies each made of a magnetic substance with teeth the number of which is P are disposed in opposition to each other while they are displaced by ½ pitch from each other so that the two gear-like bodies hold an axially magnetized permanent magnet therebetween. Such a 3-phase HB type rotational electric machine can be made to function as an actuator which can be driven by star or delta connection, and which can obtain high resolution so as to obtain excellent cost performance.

In this case, if the number of teeth of the rotor is represented by P, a 3-phase HB type rotational electric machine is established under the condition that P=m(3n±1) or P=k(6n±1).

In this case, the latter expression can be led out by the expression P=2 k(6n±1)/2 because the latter expression is equivalent to the former expression in which m is equivalent to 2 k.

Provided that, in the case of the former expression, m is the number of main poles of the stator for each phase and an integer not smaller than 1, and in the case of the latter expression, 2 k is the number of main poles of the stator for each phase and each of k and n is an integer not smaller than 1.

For example, in a case of a 12-slot stator with m=4, a step angle is 0.6° in a stepping motor with n=8 and P=100. Further, in a case of a 6-slot stator with m=2, a step angle is 1.2° in a stepping motor with n=8 and P=50.

In this case, the current I in the expression (1) is as follows.

$$I=V/(P\omega_m L) \quad (3)$$

When the value of $\omega_m$ is large, in order to make the current I large, it is necessary to make the applied voltage V large. Incidentally, L designates inductance.

To this end, a high frequency current is generated from a battery voltage by bidirectional PWM chopping or the like and this high frequency current is stepped up by a transformer or the like and applied. At a low speed operation, a low-frequency current is generated by PWM chopping so that, on the contrary, the voltage of the battery is stepped down and the lowered voltage is used to perform driving. Thus, nearly optimum driving can be obtained.

Further, the following expression (4) is established.

$$T=(EI)/\omega_m \quad (4)$$

Here, E designates a motional electromotive force.

At this time, particularly when driving is performed with open loop, the phases of the E and I become important.

Generally, at the low or intermediate speed, the phases of the E and I are different from each other and the efficiency is not good, but at the high speed, the phases of the E and I are become identical with each other and the efficiency becomes good.

Accordingly, for example, if a phase-locked loop control (PLL control) in which the phase of the rotor and the phase of the current are made fixed is performed, the above problem can be solved.

Fourth Embodiment

This embodiment corresponds to claim 7.

There is provided a 3-phase permanent magnet type rotational electric machine with inductors provided at forward ends of the respective stator main poles. The rotational electric machine is particularly useful when the number of the stator main poles for each phase is selected to be 3 (in the case where m=1) and 6 (in the case where m=2). In this case, if P=m(3n±1) or P=k(6n±1) is established, a 3-phase rotational electric machine can be configured to be large in the output torque in comparison with a 2-phase or 5-phase machine. Here, in the former expression, m designates the number of stator main poles for each phase and an integer not smaller than 1, and in the latter expression, 2 k designates the number of stator main poles for each phase. Further, each of k and n is an integer not smaller than 1.

That is, in this meaning, that which is disclosed in the fourth embodiment is a technique which is applicable to a rotational electric machine according to any one of the first, second, and third embodiments; or a rotational electric machine which is obtained by changing an outer rotor type rotational electric machine according to the first or second embodiments into an inner rotor type; or a 3-phase rotational electric machine of an outer or inner rotor type having main poles the number of which is 3 m or 6 k with 3-phase windings, the rotor being of a HB type in which the number of rotor teeth is P or being of a cylindrical type in which the number of rotor poles is 2P and the cylindrical rotor is magnetized into north (N) and south (S) magnetic poles alternately.

From this point of view, if the motor of this embodiment is subjected to closed loop control, the output can be made larger so that the motor-driven system of this embodiment has a function as an actuator which is optimum for starting up a load or for preventing step out.

Thus, by knowing the current position of the rotor, current is made to flow in the coil of the windings so that a certain angle from the rotor is made to be fixed.

That is, the motional electromotive force E is shown as $E=d\phi/dt$ with respect to the rotor magnetic flux $\phi$. Accordingly, the phase is delayed by 90°.

Thus, if the positional information of the rotor is detected, the phase of E is known and it becomes possible to control the timing for making the current I flow to result in the maximum value of EI. That is, it is possible to control the phase of current.

Fifth and Sixth Embodiments

Next, the fifth embodiment of the present invention and the sixth embodiment of the present invention will be described with reference to FIGS. 7A and 7B and FIGS. 8A and 8B, respectively.

If a 3-phase stepping motor which is excellent in efficiency and which shows torque larger than that in a 2-phase or 5-phase machine is subjected to lead angle control, it is possible to obtain a motor-driven system having a function as an actuator which is excellent in torque property and small in vibration and noise, compared with that of the 2-phase machine or the like.

Figure 7A:
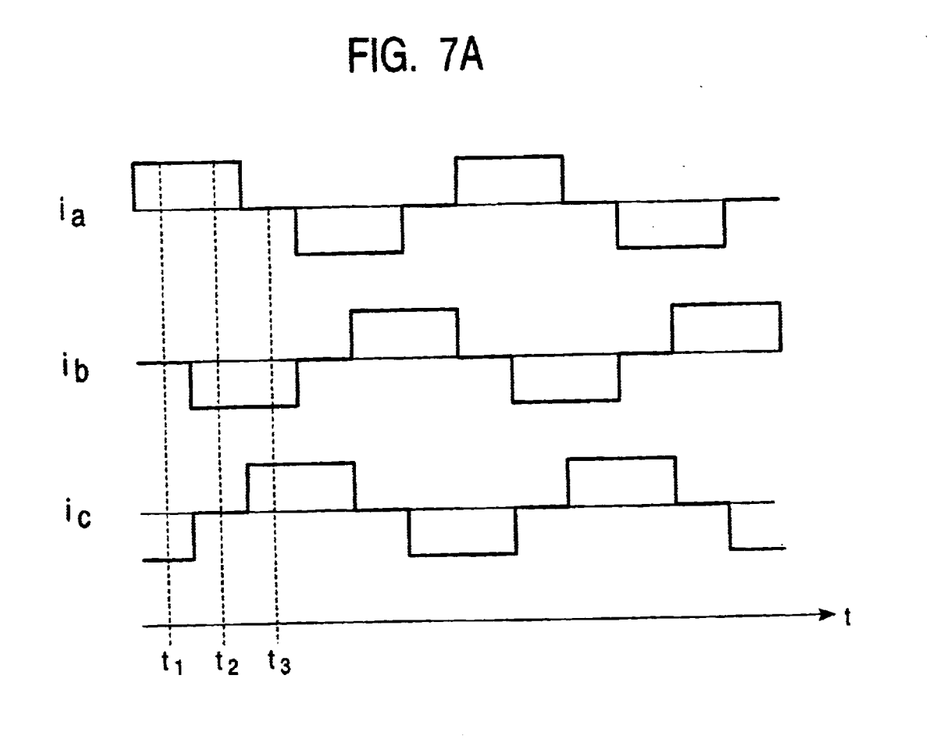
FIG. 7A shows waveforms of respective phase currents as a fifth embodiment of the motor-driven system according to the present invention.

FIG. 7A shows a current sequence diagram of respective phase currents ia, ib and ic of 2-phase excitation due to 120° current conduction of a 3-phase machine.

Figure 7B:
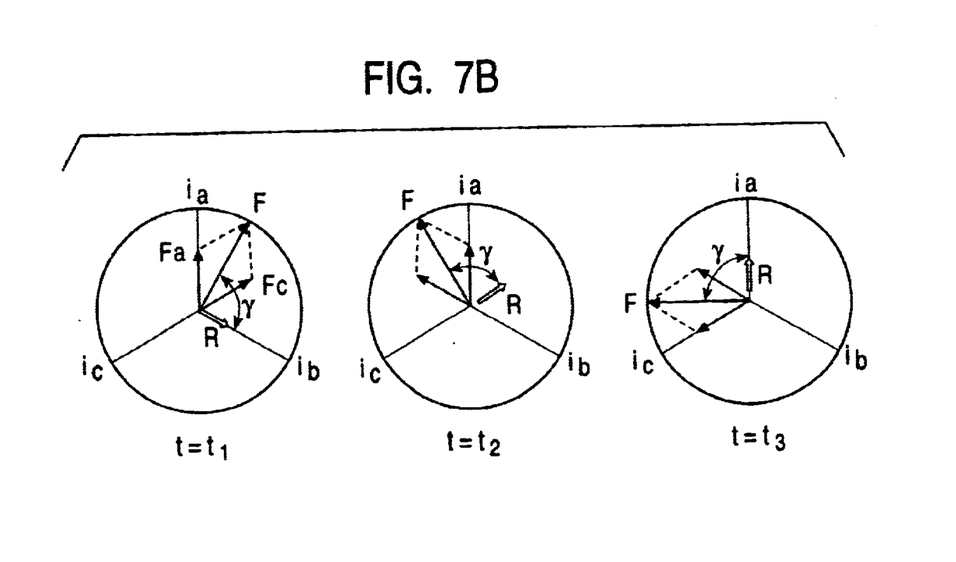
FIG. 7B is vector diagrams showing states of the rotating magnetic field due to the respective phase currents shown in FIG. 7A.

FIG. 7B shows vector diagrams of the rotating magnetic field F respectively when these currents ia, ib and ic are made to flow in a 3-phase machine at timings $t_1$, $t_2$, $t_3$ of FIG. 7A.

That is, the rotating magnetic field F moves by 60° from $t_1$ to $t_2$, and further by 60° from $t_2$ to $t_3$. Thus, the rotating magnetic field F skips by 60° every time.

R designates the magnetic pole position of the rotor and it is possible to show the torque T as follows.

$$T=kFR \sin \gamma$$

Here, k is a constant, $\gamma$ designates a phase angle between the rotating magnetic field F and the magnetic pole position R of the rotor.

Accordingly, the torque T can be made maximum at γ=90°. However, in a case of rectangular current of 120° current conduction as shown in FIG. 7A, as described above, the rotating magnetic field F cannot take any optional position but skips by 60° every time so that there may occur a situation that the phase angle γ cannot take 90° according to the position of the rotor to thereby lower the torque, generate large vibration, etc.

On the contrary, if microstep in which the current is highly divided into many parts is employed, the phase angle γ can be made near 90°. As an extreme case of the highly divided microstep, the current waveform becomes a 3-phase balanced sinusoidal AC current as shown in FIG. 8A.

Figure 8A:
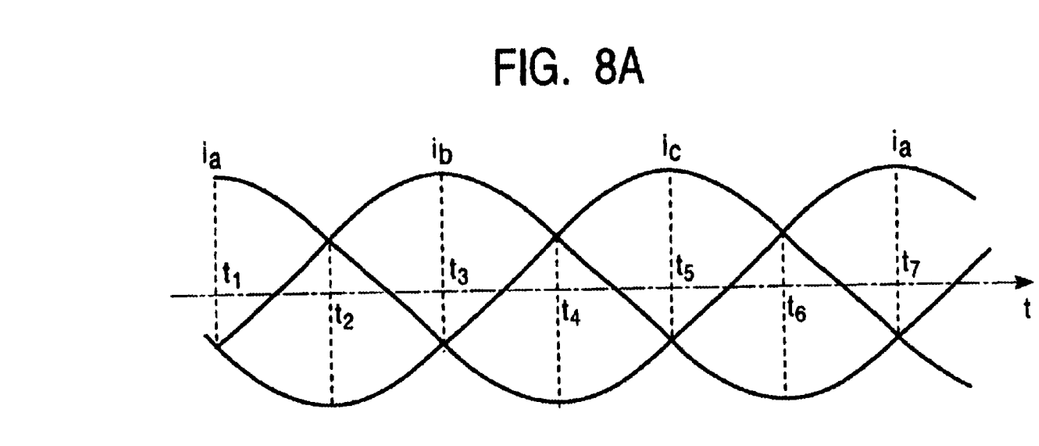
FIG. 8A shows waveforms of respective phase currents as a sixth embodiment of the motor-driven system according to the present invention.
Figure 8B:
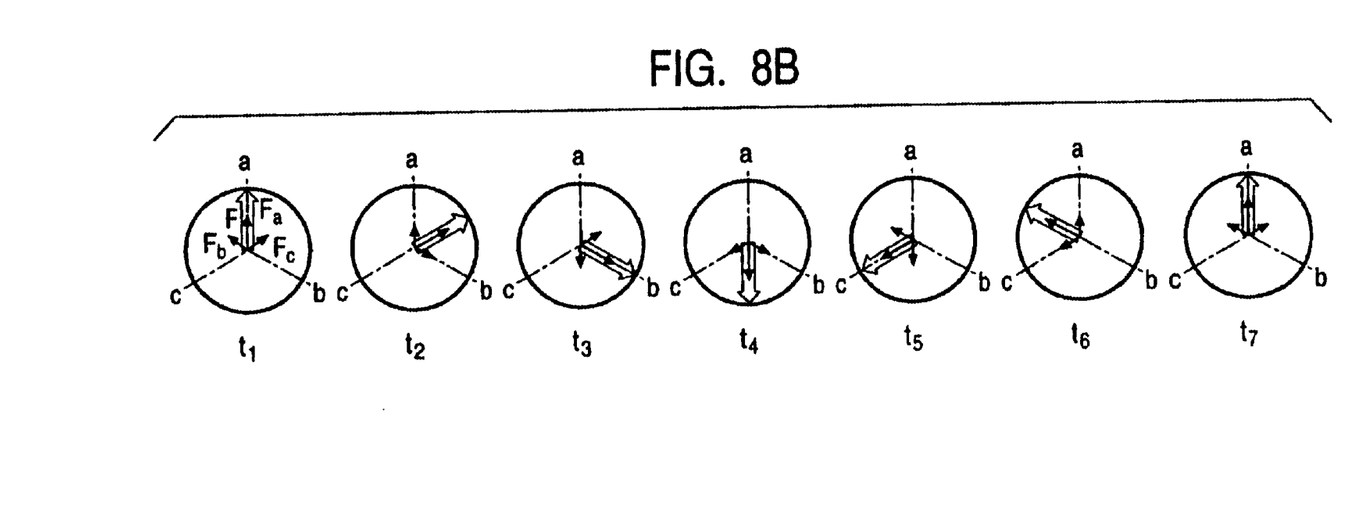
FIG. 8B is vector diagrams showing states of the rotating magnetic field due to the respective phase currents shown in FIG. 8A.

FIG. 8B shows the rotating magnetic field F in this case at the points of time $t_1, t_2, \ldots t_7$. In this case, the vector of the rotating magnetic field F can continuously take any optional position, but not skip by 60° like the case described in FIG. 8B.

That is, as shown in FIG. 8A, in optional points of time $t_1$ and $t_2$, the rotating magnetic field F can take optional positions continuously correspondingly to a change in the current. Accordingly, the phase angle γ can be retained at 90° at all times. On the contrary, it will do to make a current flow such that the rotating magnetic field F having the phase angle γ as 90° at all times is generated. Accordingly, it will do to detect the current position of the rotor R by a suitable sensor or the like so as to give such a current that gives the rotating magnetic field F with a lead angle of γ degrees.

Accordingly, preferably, the current is made to have a waveform of 3-phase sinusoidal wave or a microstep.

Incidentally, with respect to the number of main poles in the fifth embodiment, similarly to the case of the fourth embodiment, this technique can be applied to a rotational electric machine according to any one of the first, second and third embodiments; or a rotational electric machine which is obtained by changing an outer rotor type rotational electric machine according to the first or second embodiment into an inner rotor type; or a 3-phase rotational electric machine of an outer or inner rotor type having main poles the number of which is 3 m or 6 k with 3-phase windings, the rotor being of a HB type in which the number of rotor teeth is P or being of a cylindrical type in which the number of rotor poles is 2P and the cylindrical rotor is magnetized into north (N) and south (S) magnetic poles alternately.

Seventh Embodiment

Next, the seventh embodiment of the present invention will be described.

In a 3-phase permanent magnet type stepping motor, as described with reference to FIG. 7B, a step angle is an electric angle of 60°.

Further, in the range where the load angle γ is not larger than 90°, torque which is always attracted to the axis of the rotating magnetic field F acts normally and it is preferable in economical point to make the motor be an open loop stepping motor. The motor operates as an stable actuator in which no vibration or the like is generated at the time of standstill.

However, if the load increases so that the load angle γ exceeds 90°, the motor becomes apt to generate synchronous step out.

In this case, if motor is made to be a closed loop brushless motor and the current is controlled so that the load angle γ takes 90°, it is possible to obtain a motor-driven system having a function as an actuator which operates as a multipole brushless motor and which is stable and causes no step-out.

The present invention is not limited to those embodiments described above but can be modified variously within the scope of the above-mentioned technical thought of the present invention.

Incidentally, as the positional information sensor for detecting the rotor of a 3-phase motor with inductors according to the present invention, an optical encoder or a resolver system in which a change of inductance is converted into a change of voltage or the like may be used.

By making the configuration as any one of those embodiments described above, the motor-driven system having the stator provided with inductors according to the present invention has excellent effects as follows.

(1) The configuration stated in the first aspect shows the following effects.
  (i) With the configuration that each main pole of the stator is provided with an inductor constituted by a plurality of magnetic teeth, the number of poles of the rotor can be made large so that low-speed and large-torque driving can be performed.
  (ii) Because of the outer rotor type configuration, the rotor outside portion or the like can be fitted to an inside or a side portion of a wheel or a drum, so that the system can be made compact.
  (iii) The magnetic poles of the outer rotor type permanent magnet rotor can be formed by magnetization so that the magnetic field flux can be distributed sinusoidally to thereby bring about low vibration.

(2) The configuration stated in the second aspect can bring about the following effects. That is, besides the above-mentioned effects (1) (i)–(ii), because of the configuration that the rotor has magnetic teeth formed on the inner circumference thereof, it is possible to make the configuration simple and inexpensive.

(3) If a reduction gear is provided as stated in the third aspect, it is possible to make the reduction gear small in reduction gear ratio and compact in size.

(4) If the stator has a 3-phase winding structure as stated in the fourth aspect, the motor is made to be a 3-phase machine so that 3-terminal driving can be performed with star-connection or delta connection and the driving becomes simple.

Further, in the case of 3-phase machine, the machine is not affected by the magnetic field or the third harmonic of the current so that the rotation of the motor is smooth.

(5) If the configuration is made as stated in the fifth aspect, the applied voltage is stepped up/down by chopping. Accordingly, if constant current driving is performed, the motor can be made to start up at high-speed large torque driving and the voltage applied to the motor can be changed in accordance with the speed. As a result, it is possible to perform high output and high efficient driving.

(6) If the phase of current is controlled with respect to the motional electromotive force of the rotational electric machine as stated in the sixth aspect, it is possible to perform driving with the optimum torque in accordance with the speed.

(7) If the configuration is made as stated in the seventh aspect, by realizing this configuration in a 3-phase machine, it is possible to provide an actuator which is excellent in efficiency with low vibration, compared with a conventional case (2-phase machine).

(8) If the configuration is made as stated in the eighth or ninth aspects, the excitation current waveform of the 3-phase machine can be made to be not only rectangular waveform with 120° current conduction but also stepwise waveform of microsteps or sinusoidal waveform. Accordingly, the degree of freedom in the value of lead angle γ increases, it is possible to realize γ=90°, and it is possible to further improve the efficiency.

(9) If the configuration is made as stated in the tenth aspect, in accordance with the value of the angle γ, it is possible to make the machine operate as a 3-phase stepping motor or as a 3-phase brushless motor. Accordingly, in accordance with the load, it is possible to cope with the load by an optimum kind of motor by making the motor operate as a 3-phase stepping motor or a 3-phase brushless motor. Thus, convenience in use, improvement in general characteristic of a motor suited for the load, and improvement in economical point can be obtained.

I claim:

1. A motor-driven system comprising:
   a rotational electric machine of a 3-phase PM type including,
      a stator having an annular magnetic substance, main poles extending radially outward from said magnetic substance, windings wound on said main poles respectively, and inductors each constituted by a plurality of magnetic teeth formed at a forward end of a corresponding one of said main poles, and
      an outer rotor type permanent magnet rotor having north (N) and south (S) magnetic poles arranged alternately on an inner circumference of said rotor and in a rotating direction of said rotor in which a number of rotor poles is 2P, said stator and said rotor being in opposition to each other while an air gap is held therebetween; and
      an outer rotating body directly mounted on said rotor to directly drive a load that contacts an outer circumference thereof,
      wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

2. A motor-driven system comprising:
   a rotational electric machine of a 3-phase VR type including,
      a stator having an annular magnetic substance, main poles extending radially outward from said magnetic substance, windings wound on said main poles respectively, and inductors each constituted by a plurality of magnetic teeth formed at a forward end of a corresponding one of said main poles, and
      an outer rotor type rotor constituted by a magnetic substance having magnetic teeth formed on an inner circumference thereof in which a number of rotor teeth is P, said stator and said rotor being in opposition to each other while an air gap is held therebetween; and
      an outer rotating body directly mounted on said rotor to directly drive a load that contacts an outer circumference thereof,
      wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

3. A motor-driven system comprising:
   a rotational electric machine of 3-phase PM type including,
      a stator having an annular magnetic substance, main poles extending radially outward from said magnetic substance, windings wound on said main poles respectively, and inductors each constituted by a plurality of magnetic teeth formed at a forward end of a corresponding one of said main poles, and
      an outer rotor type permanent magnet rotor having north (N) and south (S) magnetic poles arranged alternately on an inner circumference of said rotor and in a rotating direction of said rotor in which a number of rotor poles is 2P, said stator and said rotor being in opposition to each other while an air gap is held therebetween; and
      an outer rotating body mounted on said rotor through an output portion of a reduction gear to directly drive a load that contacts an outer circumference thereof,
      wherein a rotation axis of said output portion is concentric with a rotation axis of said rotational electric machine, and
      wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

4. A motor-driven system comprising:
   a rotational electric machine of a 3-phase VR type including,
      a stator having an annular magnetic substance, main poles extending radially outward from said magnetic substance, windings wound on said main poles respectively, and inductors each constituted by a plurality of magnetic teeth formed at a forward end of a corresponding one of said main poles, and
      an outer rotor type rotor constituted by a magnetic substance having magnetic teeth formed on an inner circumference thereof in which a number of rotor teeth is P, said stator and said rotor being in opposition to each other while an air gap is held therebetween; and
      an outer rotating body mounted on said rotor through an output portion of a reduction gear to directly drive a load that contacts an outer circumference thereof,
      wherein a rotation axis of said output portion is concentric with a rotation axis of said rotational electric machine, and
      wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

5. The motor-driven system according to one of claims 1 to 4, wherein said stator has a 3-phase winding structure.

6. The motor-driven system according to one of claims 1 to 4, wherein a voltage to be applied to said rotational electric machine is stepped up/down by chopping.

7. The motor-driven system according to one of claims 1 to 4, wherein a phase of current relative to a motional electromotive force of said rotational electric machine is controlled.

8. The motor-driven system according to one of claims 1 to 4, wherein positional information of said rotor is obtained to thereby obtain timing of excitation of windings.

9. The motor-driven system according to one of claims 1 to 4, wherein said rotational electric machine is excited by 3-phase AC current excitation, microstep excitation, or full step excitation such that an axis of a rotating magnetic field is advanced by γ degrees with respect to a magnetic pole position of said rotor.

10. The motor-driven system according to claim 9, wherein the value of γ is equal to 90° (γ90°) in terms of electrical angle.

11. The motor-driven system according to claim 9, wherein the value γ is in a range of 0<γ≦90° and said motor is driven as an open loop stepping motor.

12. The motor-driven system according to claim 9, wherein the value of γ satisfies γ>90° and said motor is driven as a closed loop brushless motor.

13. A motor-driven system comprising:
a rotational electric machine of a 3-phase PM type including,
   a stator having an annular magnetic substance, main poles extending radially inward from said magnetic substance, windings wound on said main poles respectively, and inductors each constituted by a plurality of magnetic teeth formed at a forward end of a corresponding one of said main poles, and
   an inner rotor type permanent magnet rotor having north (N) and south (S) magnetic poles arranged alternately on an outer circumference of said rotor and in a rotating direction of said rotor in which a number of rotor poles is 2P, said stator and said rotor being in opposition to each other while an air gap is held therebetween; and
   an outer rotating body driven by an output of said rotor to directly drive a load that contacts an outer circumference thereof,
   wherein a voltage to be applied to said rotational electric machine is stepped up/down by chopping, and
   wherein P=m (3n±1) in which m is the number of main voles of the stator for each phase and an integer not smaller than 1, or P=k (6n±1) in which 2k is the number of main poles of the stator for each phase and each of k and n is an integer not smaller than 1.

14. A motor-driven system comprising:
a rotational electric machine of a 3-phase VR type including,
   a stator having an annular magnetic substance, main poles extending radially inward from said magnetic substance, windings wound on said main poles respectively, and inductors each constituted by a plurality of magnetic teeth formed at a forward end of a corresponding one of said main poles, and
   an inner rotor type rotor constituted by a magnetic substance having magnetic teeth formed on an outer circumference thereof in which a number of rotor teeth is P, said stator and said rotor being in opposition to each other while an air gap is held therebetween; and
   an outer rotating body driven by an output of said rotor to directly drive a load that contacts an outer circumference thereof,
   wherein a voltage to be applied to said rotational electric machine is stepped up/down by chopping, and
   wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

15. A motor-driven system comprising:
a rotational electric machine of a 3-phase HB type, including:
   a stator having an annular magnetic substance, main poles extending radially inward from said magnetic substance, windings wound on said main poles respectively, and inductors each constituted by a plurality of magnetic teeth formed at a forward end of a corresponding one of said main poles, and
   an inner rotor HB type rotor in which the number of rotor teeth is P, said stator and said rotor being in opposition to each other while an air gap is held therebetween; and
   an outer rotating body driven by an output of said rotor to directly drive a load that contacts an outer circumference thereof,
   wherein P=m(3n±1) in which m is the number of main poles of the stator for each phase and an integer not smaller than 1, or P=k (6n±1) in which 2k is the number of main poles of the stator for each phase and each of k and n is an integer not smaller than 1, and
   wherein a voltage to be applied to said rotational electric machine is stepped up/down by chopping.

16. A motor-driven system comprising:
a rotational electric machine of a 3-phase PM type including,
   a stator having an annular magnetic substance, main poles extending radially inward from said magnetic substance, windings wound on said main poles respectively, and inductors each constituted by a plurality of magnetic teeth formed at a forward end of a corresponding one of said main poles, and
   an inner rotor type permanent magnet rotor having north (N) and south (S) magnetic poles arranged alternately on an outer circumference of said rotor and in a rotating direction of said rotor in which a number of rotor voles in 2P, said stator and said rotor being in opposition to each other while an air gap is held therebetween; and
   an outer rotating body driven by an output of said rotor to directly drive a load that contacts an outer circumference thereof,
   wherein a phase of current relative to a motional electromotive force of said rotational electric machine is controlled, and
   wherein P=m (3n±1) in which m is the number of main voles of the stator for each phase and an integer not smaller than 1, or P=k (6n±1) in which 2k is the number of main poles of the stator for each phase and each of k and n is an integer not smaller than 1.

17. A motor-driven system comprising:
a rotational electric machine of a 3-phase VR type including,
   a stator having an annular magnetic substance, main poles extending radially inward from said magnetic substance, windings wound on said main poles respectively, and inductors each constituted by a plurality of magnetic teeth formed at a forward end of a corresponding one of said main poles, and
   an inner rotor type rotor constituted by a magnetic substance having magnetic teeth formed on an outer circumference thereof in which a number of rotor teeth is P, said stator and said rotor being in opposition to each other while an air gap is held therebetween; and
   an outer rotating body driven by an output of said rotor to directly drive a load that contacts an outer circumference thereof,
   wherein a phase of current relative to a motional electromotive force of said rotational electric machine is controlled, and
   wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

18. A motor-driven system comprising:
a rotational electric machine of a 3-phase HB type, including, a stator having an annular magnetic substance, main poles extending radially inward from said magnetic substance, windings wound on said main poles respectively, and inductors each constituted by a plurality of magnetic teeth formed at a forward end of a corresponding one of said main poles, and an inner rotor HB type rotor in which the number of rotor teeth is P, said stator and said rotor being in opposition to each other while an air gap is held therebetween; and an outer rotating body driven by an output of said rotor to directly drive a load that contacts an outer circumference thereof, wherein P=m (3n±1) in which in is the number of main poles of the stator for each phase and an integer not smaller than 1, or P=k (6n±1) in which 2k is the number of main poles of the stator for each phase and each of k and n is an integer not smaller than 1, and wherein a phase of current relative to a motional electromotive force of said rotational electric machine is controlled.

19. A motor-driven system comprising:

a rotational electric machine of a 3-phase PM type including, a stator having an annular magnetic substance, main poles extending radially inward from said magnetic substance, windings wound on said main poles respectively, and inductors each constituted by a plurality of magnetic teeth formed at a forward end of a corresponding one of said main poles, and an inner rotor type permanent magnet rotor having north (N) and south (S) magnetic poles arranged alternately on an outer circumference of said rotor and in a rotating direction of said rotor in which a number of rotor poles is 2P said stator and said rotor being in opposition to each other while an air gap is held therebetween; and an outer rotating body driven by an output of said rotor to directly drive a load that contacts an outer circumference thereof, wherein positional information of said rotor is obtained to thereby obtain timing of excitation of windings, and wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

20. A motor-driven system comprising:

a rotational electric machine of a 3-phase VR type including, a stator having an annular magnetic substance, main poles extending radially inward from said magnetic substance, windings wound on said main poles respectively, and inductors each constituted by a plurality of magnetic teeth formed at a forward end of a corresponding one of said main poles, and an inner rotor type rotor constituted by a magnetic substance having magnetic teeth formed on an outer circumference thereof in which a number of rotor teeth is P, said stator and said rotor being in opposition to each other while an air gap is held therebetween; and an outer rotating body driven by an output of said rotor to directly drive a load that contacts an outer circumference thereof, wherein positional information of said rotor is obtained to thereby obtain timing of excitation of windings, and wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

21. A motor-driven system comprising:

a rotational electric machine of 3-phase PM type including, a stator having an annular magnetic substance, main poles extending radially inward from said magnetic substance, windings wound on said main poles respectively, and inductors each constituted by a plurality of magnetic teeth formed at a forward end of a corresponding one of said main poles, and an inner rotor type permanent magnet rotor having north (N) and south (S) magnetic poles arranged alternately on an outer circumference of said rotor and in a rotating direction of said rotor in which a number of rotor voles is 2P said stator and said rotor being in opposition to each other while an air gap is held therebetween; and an outer rotating body driven by an output of said rotor to directly drive a load that contacts an outer circumference thereof, wherein said rotational electric machine is excited by 3-phase AC current excitation, microstep excitation, or full step excitation such that an axis of a rotating magnetic field is advanced by γ degrees with respect to a magnetic pole position of said rotor, and wherein P=m (3n±1) in which m is the number of main voles of the stator for each phase and an integer not smaller than 1, or P=k (6n±1) in which 2k is the number of main poles of the stator for each phase and each of k and n is an integer not smaller than 1.

22. A motor-driven system comprising:

a rotational electric machine of a 3-phase VR type including, a stator having an annular magnetic substance, main poles extending radially inward from said magnetic substance, windings wound on said main poles respectively, and inductors each constituted by a plurality of magnetic teeth formed at a forward end of a corresponding one of said main poles, and an inner rotor type rotor constituted by a magnetic substance having magnetic teeth formed on an outer circumference thereof in which a number of rotor teeth is P, said stator and said rotor being in opposition to each other while an air gap is held therebetween; and an outer rotating body driven by an output of said rotor to directly drive a load that contacts an outer circumference thereof, said rotational electric machine is excited by 3-phase AC current excitation, microstep excitation, or full step excitation such that an axis of a rotating magnetic field is advanced by γ degrees with respect to a magnetic pole position of said rotor, wherein P=m (3n±1) in which m is the number of main poles of the stator for each phase and an integer not smaller than 1, or P=k (6n±1) in which 2k is the number of main poles of the stator for each phase and each of k and n is an integer not smaller than 1.

23. A motor-driven system comprising:

a rotational electric machine of a 3-phase HB type including, a stator having an annular magnetic substance, main poles extending radially from said magnetic substance, windings wound on said main poles respectively, and inductors each constituted by a plurality of magnetic teeth formed at a forward end of a corresponding one of said main poles, and an HB type rotor in which the number of rotor teeth is P, said stator and said rotor being in opposition to each other while an air gap is held therebetween; and an outer rotating body driven by an output of said rotor to directly drive a load that contacts an outer circumference thereof, wherein P=n (3n±1) in which m is the number of main poles of the stator for each phase and an integer not smaller than 1, or P=k(6n±1) in which 2k is the number of main poles of the stator for each phase and each of k and n is an integer not smaller than 1, and wherein positional information of said rotor is obtained to thereby obtain timing of excitation of windings.

24. A motor-driven system comprising:

a rotational electric machine of 3-phase PM type, including, a stator having an annular magnetic substance, main poles extending radially from said magnetic substance, windings wound on said main poles respectively, and inductors each constituted by a plurality of magnetic teeth formed at a forward end of a corresponding one of said main poles, and a cylindrical permanent magnet type rotor that is magnetized into north (N) and south (S) magnetic poles alternatively in which the number of rotor poles is 2P, said stator and said rotor being in opposition to each other while an air gap is held therebetween; and an outer rotating body driven by an output of said rotor to directly drive a load that contacts an outer circumference thereof, wherein P=m(3n±1) in which m is the number of main poles of the stator for each phase and an integer not smaller than 1, or P=k (6n±1) in which 2k is the number of main poles of the stator for each phase and each of k and n is an integer not smaller than 1, and wherein positional information of said rotor is obtained to thereby obtain timing of excitation of windings.

25. A motor-driven system comprising:

a rotational electric machine of a 3-phase HB type, including, a stator having an annular magnetic substance, main poles extending radially from said magnetic substance, windings wound on said main poles respectively, and inductors each constituted by a plurality of magnetic teeth formed at a forward end of a corresponding one of said main poles, and an HB type rotor in which the number of rotor teeth is P, said stator and said rotor being in opposition to each other while an air gap is held therebetween; and an outer rotating body driven by an output of said rotor to directly drive a load that contacts an outer circumference thereof, wherein P=m (3n±1) in which m is the number of main poles of the stator for each phase and an integer not smaller than 1, or P=k (6n±1) in which 2k is the number of main poles of the stator for each phase and each of k and n is an integer not smaller than 1, and wherein said rotational electric machine is excited by 3-phase AC current excitation, microstep excitation, or full step excitation such that an axis of a rotating magnetic field is advanced by γ degrees with respect to a magnetic pole position of said rotor.

26. A motor-driven system comprising:

a rotational electric machine of 3-phase PM type, including, a stator having an annular magnetic substance, main poles extending radially from said magnetic substance, windings wound on said main poles respectively, and inductors each constituted by a plurality of magnetic teeth formed at a forward end of a corresponding one of said main poles, and a cylindrical permanent magnet type rotor that is magnetized into north (N) and south (S) magnetic poles alternatively in which the number of rotor poles is 2P, said stator and said rotor being in opposition to each other while an air gap is held therebetween; and an outer rotating body mounted on said rotor to directly drive a load that contacts an outer circumference thereof, wherein p=m(3n±1) in which m is the number of main poles of the stator for each phase and an integer not smaller than 1, or P=k (6n±1) in which 2k is the number of main poles of the stator for each phase and each of k and n is an integer not smaller than 1, and wherein said rotational electric machine is excited by 3-phase AC current excitation, microstep excitation, or full step excitation such that an axis of a rotating magnetic field is advanced by γ degrees with respect to a magnetic pole position of said rotor.

27. A motor-driven system comprising:

a rotational electric machine of a 3-phase HB type, including, a stator having an annular magnetic substance, main poles extending radially inward from said magnetic substance, windings wound on said main poles respectively, and inductors each constituted by a plurality of magnetic teeth formed at a forward end of a corresponding one of said main poles, and an inner rotor HB type rotor in which the number of rotor teeth is P, said stator and said rotor being in opposition to each other while an air gap is held therebetween, wherein P=m(3n±1) in which m is the number of main poles of the stator for each phase and an integer not smaller than 1, or P=k (6n±1) in which 2k is the number of main poles of the stator for each phase and each of k and n is an integer not smaller than 1, and wherein a phase of current relative to a motional electromotive force of said rotational electric machine is controlled.

28. A motor-driven system comprising:

a rotational electric machine of a 3-phase HB type, including, a stator having an annular magnetic substance, main poles extending radially from said magnetic substance, windings wound on said main poles respectively, and inductors each constituted by a plurality of magnetic teeth formed at a forward end of a corresponding one of said main poles, and an HB type rotor in which the number of rotor teeth is P, said stator and said rotor being in opposition to each other while an air gap is held therebetween, wherein P=m(3n±1) in which m is the number of main poles of the stator for each phase and an integer not smaller than 1, or P=k (6n±1) in which 2k is the number of main poles of the stator for each phase and each of k and n is an integer not smaller than 1, and wherein positional information of said rotor is obtained to thereby obtain timing of excitation of windings.

29. A motor-driven system comprising:
a rotational electric machine of 3-phase PM type, including,
- a stator having an annular magnetic substance, main poles extending radially from said magnetic substance, windings wound on said main poles respectively, and inductors each constituted by a plurality of magnetic teeth formed at a forward end of a corresponding one of said main poles, and
- a cylindrical permanent magnet type rotor that is magnetized into north (N) and south (S) magnetic poles alternatively in which the number of rotor poles is 2P, said stator and said rotor being in opposition to each other while an air gap is held therebetween,
- wherein P=m(3n±1) in which m is the number of main poles of the stator for each phase and an integer not smaller than 1, or P=k(6n±1) in which 2k is the number of main poles of the stator for each phase and each of k and n is an integer not smaller than 1, and
- wherein positional information of said rotor is obtained to thereby obtain timing of excitation of windings.

30. A motor-driven system comprising:
a rotational electric machine of a 3-phase HB type, including,
- a stator having an annular magnetic substance, main poles extending radially from said magnetic substance, windings wound on said main poles respectively, and inductors each constituted by a plurality of magnetic teeth formed at a forward end of a corresponding one of said main poles, and
- an HB type rotor in which the number of rotor teeth is P, said stator and said rotor being in opposition to each other while an air gap is held therebetween,
- wherein P=m (3n±1) in which m is the number of main poles of the stator for each phase and an integer not smaller than 1, or P=k (6n±1) in which 2k is the number of main poles of the stator for each phase and each of k and n is an integer not smaller than 1, and
- wherein said rotational electric machine is excited by 3-phase AC current excitation, microstep excitation, or full step excitation such that an axis of a rotating magnetic field is advanced by γ degrees with respect to a magnetic pole position of said rotor.

31. A motor-driven system comprising:
a rotational electric machine of 3-phase PM type, including,
- a stator having an annular magnetic substance, main poles extending radially from said magnetic substance, windings wound on said main poles respectively, and inductors each constituted by a plurality of magnetic teeth formed at a forward end of a corresponding one of said main poles, and
- a cylindrical permanent magnet type rotor that is magnetized into north (N) and south (S) magnetic poles alternatively in which the number of rotor poles is 2P, said stator and said rotor being in opposition to each other while an air gap is held therebetween,
- wherein P=m(3n±1) in which m is the number of main poles of the stator for each phase and an integer not smaller than 1, or P=k (6n±1) in which 2k is the number of main poles of the stator for each phase and each of k and n is an integer not smaller than 1, and
- wherein said rotational electric machine is excited by 3-phase AC current excitation, microstep excitation, or full step excitation such that an axis of a rotating magnetic field is advanced by γ degrees with respect to a magnetic pole position of said rotor.

32. The motor-driven system according to one of claims 21, 22, 25, 26, 30 and 31, wherein the value of γ is equal to 90° (γ=90°) in terms of electrical angle.

33. The motor-driven system according to one of claims 21, 22, 25, 26, 30 and 31, wherein the value of γ is in a range of 0<γ<_90° and said motor is driven as an open loop stepping motor.

34. The motor-driven system according to one of claims 21, 22, 25, 26, 30 and 31, wherein the value of γ satisfies γ>90° and said motor is driven as a closed loop brushless motor.

* * * * *